Oct. 9, 1928. 1,687,066
J. H. HASTE
MOTION PICTURE FILM STRIP
Filed Aug. 23, 1926
FIG - 1 -
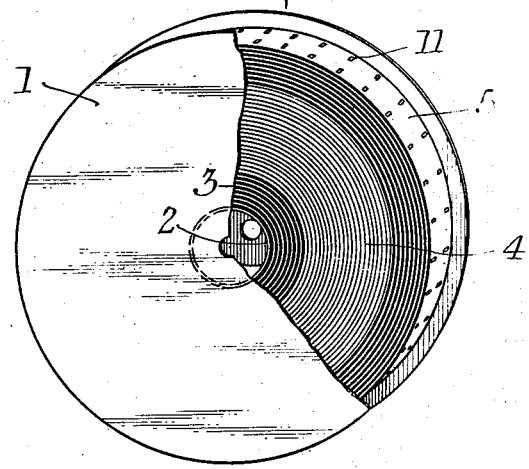
FIG - 2 -
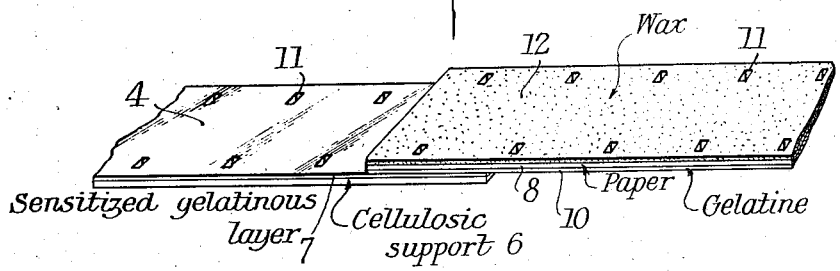
James H. Haste,
INVENTOR,
BY
ATTORNEYS.

Patented Oct. 9, 1928.

1,687,066

UNITED STATES PATENT OFFICE.

JAMES H. HASTE, OF ROCHESTER, NEW YORK, ASSIGNOR TO EASTMAN KODAK COMPANY, OF ROCHESTER, NEW YORK, A CORPORATION OF NEW YORK.

MOTION-PICTURE-FILM STRIP.

Application filed August 23, 1926. Serial No. 130,786.

This invention relates to motion picture film and more particularly to such film as is furnished in a cartridge for daylight loading in a camera.

As thus furnished, a typical cartridge comprises a reel having wound thereon a band of film with protective paper bands attached to the ends thereof. This may be used in cameras of various types, typical examples being shown in the patents to Tessier 1,572,252, granted Feb. 9, 1926, and Wittel 1,588,082 granted June 8, 1926.

In such apparatus, the film strip is fed in a self supported loop from a feeding means, such as a sprocket, to a gate through which it is advanced, and thence in another loop to a feeding means. At the gate, the film usually passes between spring pressed guide strips having apertures for the exposure and for the intermittent mechanism. There is a tendency for particles of emulsion to be scraped or dislodged from the sensitive layer and to be built up on the smooth guiding surfaces, thereby greatly increasing the friction between the film and the slidway, and also to pile up on the edge of the exposure window where it renders the edge of the exposed image rough and uneven. In a spring driven portable camera, this is particularly disadvantageous, as the springs are made as light as possible to increase the portability of the camera, and the increased friction due to this cause may become so great as practically to render the camera inoperative.

Another difficulty, sometimes encountered, is that the paper protective bands having much less body than the film band, develop a tendency to buckle as they are being fed through the mechanism and do not maintain the self-supported loops. This is particularly liable to be the case where the film strip has been subjected to humid atmospheric conditions, tending to make the paper especially limp. Under such conditions, moreover, the protection afforded the film by the paper against atmospheric influences is lessened.

The objects of my invention are to decrease the tendency of the emulsion to be scraped off, to render the film at all times easily slidable through the gate to maintain the stiffness and elasticity of the protective strip, to increase the protection afforded these strips and the sensitive film against moisture and to render the lead strips readily attachable to the film.

The above and other objects are attained by applying to that surface of the leader band which constitutes a continuation of the sensitized surface of the film band a coating of wax or wax-like substance. This coating sufficiently protects the paper from the absorption of water for it to retain its natural resiliency and at the same time, the wax coating, passing over the slideways in advance of the film, leaves a very slight but sufficient deposit thereon which causes the film to slide through without perceptibly increased friction, even when the gate remains uncleaned after long usage.

Reference will now be made to the accompanying drawing wherein the same reference characters denote the same parts throughout.

Fig. 1 is a perspective view of a reel of film embodying my invention, one flange being partly broken away.

Fig. 2 is a perspective view on an enlarged scale of a portion of the film strip, including the junction of the sensitized portion and the leader band, the thicknesses being much exaggerated.

The film cartridge, as furnished for camera use, comprises a reel having side flanges 1, and a core 2, upon which is wound a protective portion 3, coiled directly on the core, an unexposed sensitized film portion 4 attached at one end to the outer end of the protective portion 3 and an outer leader band or protective portion 5 attached at one end to the outer end of the coiled sensitized portion 4 and wound around it, the protective portions 3 and 5 thus forming continuations of the sensitized portion 4 and the three portions 3, 4 and 5 constituting in effect a single, coiled film strip having the usual perforations 11.

The sensitized portion consists, as is usual, of a support 6 of a plastic cellulosic product, such as a composition of cellulose acetate, celluose nitrate, cellulose ether, viscose or the like, (preferably cellulose acetate) upon one surface of which is a light sensitive layer 7, such as a gelatino-silver-halide emulsion.

The leader band 5 consists of a paper band 8 one surface of which has a coating or sizing 10 of gelatine by which it is the more readily attached to the sensitized gelatinous layer 7 by glue or other adhesive and the other surface of which has a coating 12 of wax or wax-like substance.

For ease of manufacture, the paper is preferably coated in wide bands by usual methods and then slit and cut to the desired sizes.

Natural or artificial waxes or equivalent waterproof soft solid lubricants may be used. Beeswax or paraffine wax, either applied cold in a volatile solvent such as carbon tetrachloride, or coated in a hot liquid condition are satisfactory. A wide variety of such waxes are known which are applicable to the invention. The resulting layer is preferably exceedingly thin.

The specific forms herein disclosed are by way of example. It is obvious that numerous embodiments are possible, and I contemplate as within my invention all such modifications and equivalents as fall within the scope of the appended claims.

Having thus described my invention, what I claim as new and desire to secure by Letters Patent is:

1. A motion picture film strip including a band of sensitized material and a protective band forming a continuation thereof and having a deposit consisting of wax upon one surface thereof.

2. A motion picture film strip including a band of flexible material having a sensitive layer upon one surface and a leader band forming a continuation of such band and having a deposit comprising wax upon its surface that constitutes a continuation of the sensitive surface.

3. As an article of manufacture, a strip of coiled material adapted for use in a motion picture camera and including a coiled band with an unexposed, sensitized layer upon one surface and a protective strip forming a continuation of the outer end of such coiled band and coiled around said band and having a deposit of wax upon that surface which constitutes a continuation of the sensitized surface.

4. A motion picture film strip including a band of material having a sensitive layer upon one surface and an unsensitized protective band attached thereto and forming a continuation thereof, and having a uniform coating of wax over that surface thereof that constitutes a continuation of the sensitive surface.

5. A motion picture film strip including a band of material having a sensitized, gelatinous layer upon one surface and a protective band secured at one end to one end of the sensitized band, the protective band comprising a paper strip having on one surface a layer of gelatine and on the other surface a wax coating, the two bands having their gelatine layers adherently attached together.

6. As an article of manufacture, a strip of coiled material adapted for use in a motion picture camera and including a coiled, sensitized film band comprising a cellulosic film support having on one surface an unexposed, sensitized, gelatinous layer and a leader band attached at one end to the outer end of the coiled film and coiled around said film, said leader band comprising a strip of paper having on one surface a layer of unsensitized gelatine and on the other surface a layer of wax, the two bands having their gelatine layers adherently attached together.

Signed at Rochester, New York this 12th day of August, 1926.

JAMES H. HASTE.